Oct. 3, 1950
A. C. DAUB
2,524,519
MACHINE FOR REMOVING PODS FROM THE
SEED OF WAX BEANS OR THE LIKE
Filed Jan. 6, 1947
2 Sheets-Sheet 1
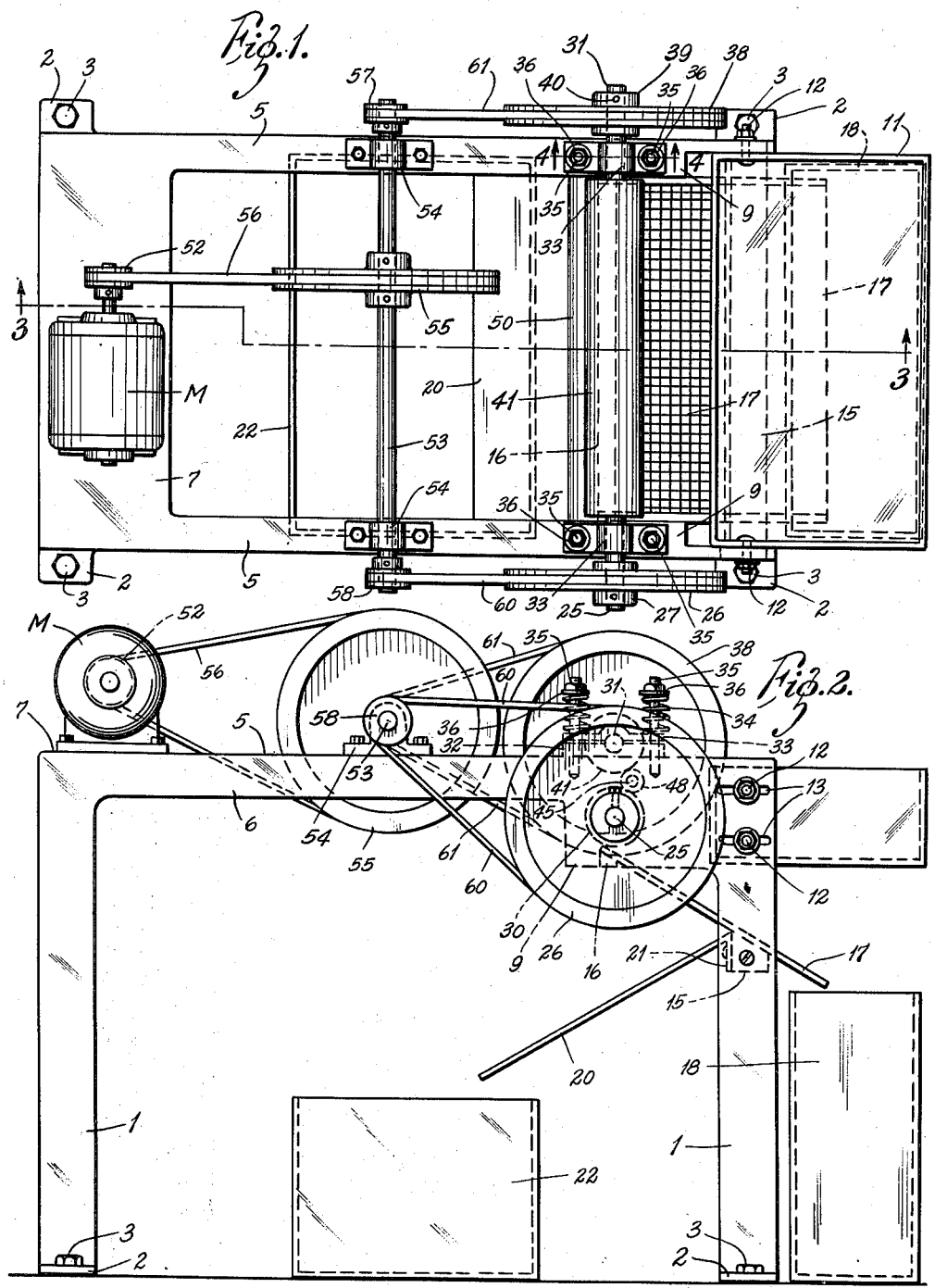
INVENTOR:
ANDREW C. DAUB,
ATTORNEYS.

Oct. 3, 1950
A. C. DAUB
2,524,519
MACHINE FOR REMOVING PODS FROM THE
SEED OF WAX BEANS OR THE LIKE
Filed Jan. 6, 1947
2 Sheets-Sheet 2
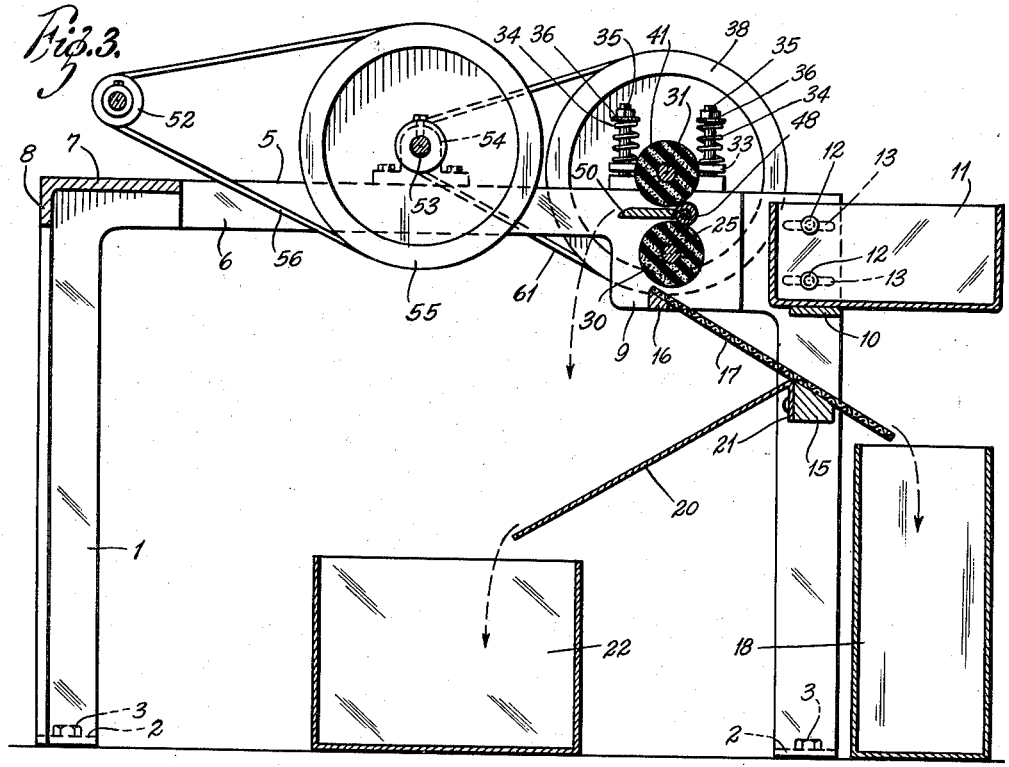
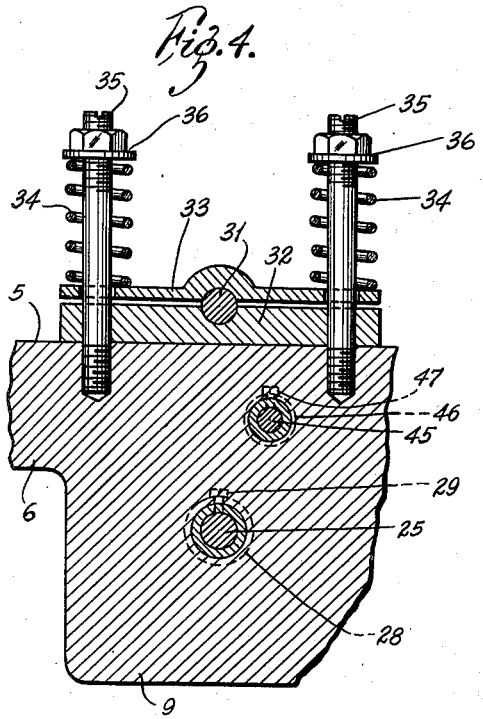
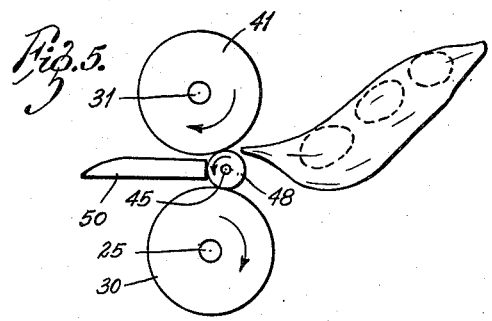
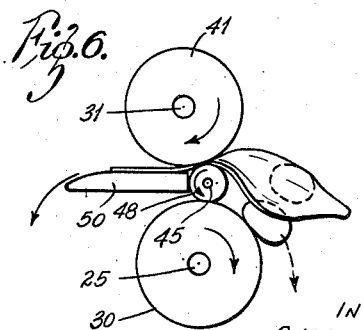
INVENTOR:
ANDREW C. DAUB,
ATTORNEYS.

Patented Oct. 3, 1950

2,524,519

UNITED STATES PATENT OFFICE 2,524,519

MACHINE FOR REMOVING PODS FROM THE SEED OF WAX BEANS OR THE LIKE

Andrew C. Daub, Kirkwood, Mo., assignor of one-half to Edward J. Methudy, University City, Mo.

Application January 6, 1947, Serial No. 720,388

11 Claims. (Cl. 130—30)

This invention relates to a machine for removing the pods from the seed of such leguminous seeds as the smooth flattened kidney-shaped seed of the commonly called wax or butter bean, or the like.

The invention is particularly concerned with the removal of the pods from the seeds of such fruit in which the seeds are sold generally in the fresh or green state, whereby the pods may be removed rapidly without injury or bruising of the seeds.

Heretofore, the general method of removal of the pods from the seed of such beans has been by hand because of the fact that any pressure upon the surface of the bean, particularly when green or undried, causes the seed to discolor, and thereby detracts from its marketability, causing loss of the product.

The primary object of the invention, therefore, is to provide a machine whereby the operation of the pod removal from such seeds may be rapidly accomplished by mechanical means with a minimum of hand labor and without injury to the seed.

Additional structural advantages resulting in simplicity and durability will be apparent to those skilled in the art as being embodied in the machine selected for illustration and hereinafter more fully disclosed, reference being made to the accompanying drawings, in which:

Fig. 1 is a plan view of the machine, certain of the parts being shown in dotted lines;

Fig. 2 is a side elevation of the left hand of the machine, being viewed from feeding relation;

Fig. 3 is a vertical section through the machine taken substantially on the line 3—3 of Fig. 1;

Fig. 4 is a partial vertical section substantially on the line 4—4 of Fig. 1;

Figs. 5 and 6 are diagrammatic illustrations showing the relationship of the pod-removing rollers and the action in the feeding into the machine of the pod and the removal of the seeds therefrom.

In the embodiment of the invention illustrated in the drawings, the machine is shown as comprising a frame work including rectangular spaced standards or legs 1 having feet 2 adapted to be bolted by bolts 3 to a horizontal permanent support. The standards or supports 1 may be of any suitable design, but conveniently, as shown, in the form of angle members.

Formed integrally with and supported upon the standards or legs 1 is an upper frame or table which includes side members 5 having depending side flanges 6 and a rear end member 7 having a depending flange 8. The forward end of the side members carries integrally therewith and integrally with the flanges 6 widened depending plates 9, which constitute the bearing supports for the rollers.

The front end of the frame has a transverse horizontally disposed plate 10 upon which the forward end of an open receptacle or container 11 is mounted. This container is for the reception of a quantity of the unhulled pods to be fed to the machine and is in the form, as shown, of an open rectangular pan. For convenience, the pan is supported for slight longitudinal adjustment toward and away from the feeding position by being carried upon studs 12 seating in elongated slots 13 in the side walls of the container 11 at the end thereof adjacent to the feeding position, so that it may be moved inwardly and outwardly to adjust itself to the reach of the particular operator operating the machine in order that such operator may easily feed the unhulled pods.

The frame also carries between the front standards a crossbar member 15, which has an inclined upper face, and between the flanges 9 is a second crossbar member 16 having its upper face in an inclined planar relation with the upper face of the member 15. A deflecting screen 17 is supported between the front standards of the machine and by the inclined faces of the members 15 and 16. The purpose of this screen is to deflect the seeds after removal from the pods into a container 18, and it also serves to screen out from the seeds small particles, insufficient in size to travel the surface of the screen. A downwardly inclined plate 20, having a flange 21 at its upper end, is secured to the rear face of the member 15 and extends downwardly into the space below the center of the frame. The purpose of this plate is to deflect the removed pods into a container 22 positioned below the lower end of the plate 20.

The removal of the pods is accomplished by a series of rollers arranged and actuated in such a manner as to receive and remove the pods without injury to the seeds. There are three rollers in the train.

These rollers include one mounted approximately at the center of the widened flanges 9 in a position below the upper surface of the upper frame member. The roller includes a center core 25, and extends laterally into horizontal aligned bearings in the flanges 9, which core constitutes a shaft with ends extending beyond the sides of the frame. This shaft carries at the left end, viewed from the operating position, a grooved pulley 26 having a hub 27 connected with the extending end of said shaft 25. At the opposite end, and in order to prevent displacement of the shaft, said shaft carries a collar 28 connected with the shaft by a setscrew 29. Fitted over the shaft 25 and within the frame members is a cored roller 30.

There is a second roller which includes a shaft 31, mounted in bearings at each side of the frame and formed from a journal 32 carried by the upper frame member, and a resiliently supported journal 33, which is resiliently actuated toward its complementary bearing member 32 by springs 34 mounted on studs 35 carried by the top frame member. The springs 34 are adjustable as to tension by a collar and nut adjustment 36 mounted over the top end of the said studs 35.

The axes of the shafts 25 and 31 are parallel and are in the same vertical plane.

The shaft 31 carries at the right end thereof, as viewed from the operator's position, a grooved pulley 38 having a hub 39 fixed to a shaft 31 by a setscrew 40. The shaft 31 likewise has mounted thereover a resilient roller 41 positioned as described in respect of the roller 30.

A third or idler roller comprising a shaft 45 is mounted in bearings in the side frame member in a position so that the axis of rotation of the roller is forward of and intermediate the axes of the shafts 25 and 31. The shaft 45 is held in position for free rotation in its bearings and from lateral displacement by collars 46 attached at opposite ends of the shaft by setscrews 47. The shaft 45 likewise carries a cored resilient roller 48 of substantially reduced diameter in respect of the rollers 30 and 41, but of sufficient diameter to maintain surface contact with the periphery of said rollers 30 and 41, in the space therebetween and forward of the plane of the axes of said rollers.

Within the space between the rollers 30 and 41 there is interposed rearwardly of the periphery of the roller 48 a plate 50, which plate is supported between the side members of the frame of the machine and constitutes a baffle or guide member to direct the pods downwardly to the plate 20 for discharge into the container 22.

The rollers 30 and 41 are driven at the same rate of speed and in the same direction by power means, which comprises a motor M mounted on a transverse support 7 of the frame. The motor shaft carries a small pulley 52 which drives a countershaft 53 journaled in bearings 54 supported at each side of the frame of the machine. The shaft 53 is driven at a reduced speed by connecting a large pulley 55 on the countershaft with the pulley 52 by a belt or other suitable power transmission connection 56. The shaft 53 extends beyond the side members of the frame and carries at each end pulleys 57 and 58 of relatively small diameter so that, from the countershaft 53, the pulleys 26 and 38 are driven by belts 60 and 61, respectively, imparting a reduced speed of rotation to the shafts 25 and 45, respectively. As the rollers 30 and 41 are rotated in the same direction and at uniform speed, and since they are in surface contact with the roller 48, said roller 48 will be driven in an opposite direction but at an accelerated angular speed.

From the foregoing description of the construction, it will be understood that the operation of the device is as follows:

*Operation*

In Fig. 5, there is represented a normal contour of the pod of the wax or butter bean, from which it will be noted that the forward end is pointed so that, when it is placed between the roller 48 and the roller 41, the forward end of the pod will be engaged between the peripheral surface of the roller 48 and the roller 41 with a slightly resilient contact due primarily to the resilient character of the rollers and the resilient mounting of the roller 41. Therefore, the contact will not be a crushing contact. The roller 48 will rapidly advance the forward end of the pod, as indicated diagrammatically in Fig. 6, causing the pod to open along the bottom edge thereof and causing the seeds contained in the pod, arranged serially as indicated in Fig. 5, to be discharged onto the surface of the roller 30, which carries the seeds successively forwardly and downwardly so that, when released, the seeds successively fall upon the top surface of the screen 17 and by gravity are deposited into the container 18. The pod continues forwardly between the surface of the rollers 48 and 41, and is advanced to the upper face of the plate 50, from which it is discharged by gravity to the plate 20 and thence to the container 22. Small particles contained in the pod and discharged therefrom with the seeds will pass through the screen, and will discharge upon the plate 20, and thence to the container 22.

A quantity of the pods containing the seeds may be conveniently placed in the container 11, and manually taken therefrom and fed into a feeding position by an operator as rapidly as the dexterity of the operator will permit. The pods may be fed continuously, one after another, as it is not necessary for the seeds to be discharged from one pod before another is fed. There is ample space across the feeding line to accommodate the pods in rapid succession.

From the foregoing, it will be understood that a machine has been provided for mechanically removing the seeds from the pods of the general character of the wax bean in such a manner as to prevent any bruising or squeezing effect on the seeds themselves, and that the seeds may be rapidly separated and accumulated in a container separate from the pods or other parts of the bean, or like article, without any injury whatever to the seeds.

The rapidity of the removal of the seeds from the pods is thereby increased many fold over the ordinary hand operation, so that the device presents a major saving in labor without detracting in the slightest from the normal condition of the separated seeds.

I am aware that the structural features of the device may be modified in certain particulars without departing from the spirit and nature of the invention, and it is to be understood that it is to be limited only by the claims which follow.

What I claim is:

1. In a machine of the character described, the combination of a pair of rollers mounted for rotation on parallel axes and having their periphery spaced apart, a third roller having its axis out of the plane of the axes of said first rollers mounted for free rotation and in surface contact with said first rollers, and power means for rotating said first rollers in the same direction whereby said third roller is rotated in the opposite direction.

2. In a machine of the character described, the combination of a pair of rollers mounted for rotation on parallel axes and having their periphery spaced apart, a third roller of reduced diameter and having its axis out of the plane of the axes of said first rollers mounted for free rotation and in surface contact with said first rollers, and power means for rotating said first rollers in the same direction whereby said third roller is rotated in the opposite direction.

3. In a machine of the character described, the combination of a pair of resilient rollers mounted for rotation on parallel axes and having their periphery spaced apart, a third resilient roller having its axis out of the plane of the axes of said first rollers mounted for free rotation and in surface contact with said first rollers, and power means for rotating said first rollers in the same direction whereby said third roller is rotated in the opposite direction.

4. In a machine of the character described, the combination of a pair of resilient rollers mounted for rotation on parallel axes and having their periphery spaced apart, a third resilient roller of a less diameter than said first rollers having its axis out of the plane of the axes of said first rollers mounted for free rotation and in surface contact with said first rollers, and power means for rotating said first rollers in the same direction whereby said third roller is rotated in the opposite direction.

5. In a machine of the character described, a pair of rollers mounted for rotation and having the peripheries thereof spaced apart, a third roller mounted for free rotation within the space between said first rollers and having contact with the peripheries of said first rollers, and power means for rotating said first rollers in the same direction and at the same speed whereby said third roller is driven in the opposite direction.

6. In a machine of the character described, a pair of rollers mounted for rotation and having the peripheries thereof spaced apart, a resilient mounting for one of said rollers, a third roller mounted for free rotation within the space between said first rollers and having contact with the peripheries of said first rollers, and power means for rotating said first rollers in the same direction and at the same speed whereby said third roller is driven in the opposite direction.

7. In a machine of the character described, a pair of rollers mounted for rotation and having the peripheries thereof spaced apart, a third roller mounted for free rotation within the space between said first rollers and having contact with the peripheries of said first rollers, a horizontal plate mounted between said first rollers and in the plane of the axis of said third roller, and power means for rotating said first rollers in the same direction and at the same speed whereby said third roller is driven in the opposite direction.

8. In a machine of the character described, a pair of rollers mounted for rotation and in spaced relationship, a horizontal plate in the space between said rollers, a downwardly inclined plate having a surface below the inner end of said first-named plate, an oppositely inclined plate having a surface below the plane of the forward surface of said rollers, a third roller mounted for free revolution and positioned within the space between said first-named rollers and adjacent thereto, whereby, when said first rollers are rotated, said third roller will be rotated by surface contact in an opposite direction, and means for rotating said first rollers in the same direction and at the same speed.

9. In a machine of the character described, a pair of rollers mounted for rotation and in spaced relationship, an inclined plate below the plane of the inner surface of said rollers, an oppositely inclined plate below the outer surface of said rollers, a third roller mounted for free revolution and positioned within the space between said first-named rollers and adjacent thereto, whereby, when said first rollers are rotated, said third roller will be rotated by surface contact in an opposite direction, and power means for rotating said first rollers in the same direction and at the same speed.

10. In a machine of the character described, a pair of rollers mounted for rotation and in spaced relationship, a third roller having a reduced diameter, mounted for free revolution and positioned within the space between said first-named rollers and adjacent thereto, whereby, when said first rollers are rotated, said third roller will be rotated by surface contact in an opposite direction at an accelerated speed, and means for rotating said first rollers in the same direction and at the same speed.

11. In a machine of the character described, first and second rollers mounted for rotation and having the peripheries thereof spaced apart, a third roller mounted for free rotation within the space between said first and second rollers and having contact with the peripheries of said rollers, and means for rotating said first and second rollers in the same direction whereby said third roller is driven in the opposite direction.

ANDREW C. DAUB.

REFERENCES CITED

The following references are of record in the file of this patent:

UNITED STATES PATENTS

| Number | Name | Date |
|---|---|---|
| 52,356 | Bray et al. | Jan. 30, 1866 |
| 213,168 | Budd | Mar. 11, 1879 |
| 851,544 | Mettler | Apr. 23, 1907 |
| 858,248 | Adam | June 25, 1907 |
| 1,108,691 | Bullard et al. | Aug. 25, 1914 |
| 1,419,072 | Morelock | June 6, 1922 |
| 1,798,543 | Kodama | Mar. 31, 1931 |
| 2,183,769 | Hawkins | Dec. 19, 1939 |